UNITED STATES PATENT OFFICE.

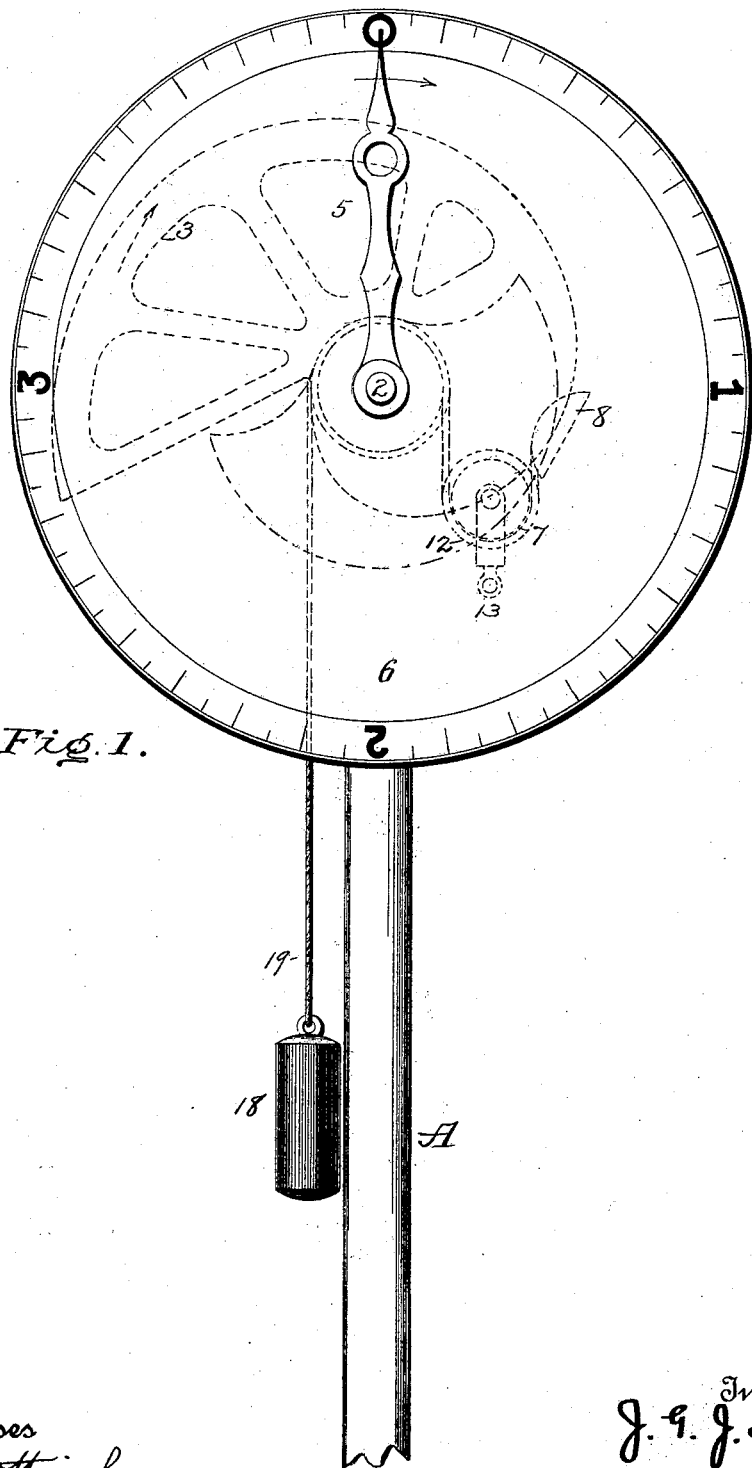

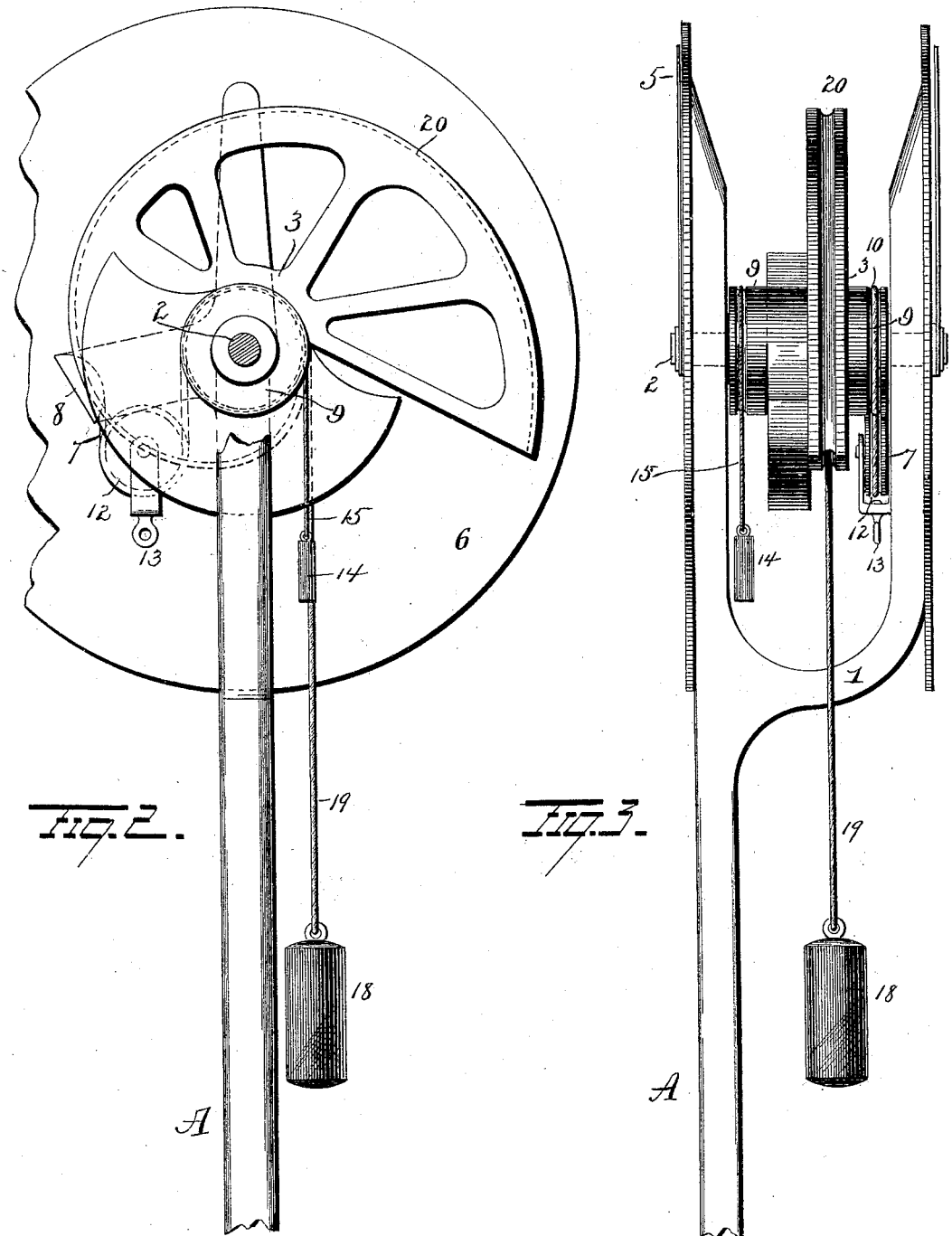

JOHN GADDY JONES DAVIS, OF AUGUSTA, GEORGIA.

WEIGHING-SCALE.

SPECIFICATION forming part of Letters Patent No. 556,308, dated March 10, 1896.

Application filed May 31, 1895. Serial No. 551,239. (No model.)

*To all whom it may concern:*

Be it known that I, JOHN GADDY JONES DAVIS, a citizen of the United States, residing at Augusta, in the county of Richmond and State of Georgia, have invented certain new and useful Improvements in Weighing-Scales; and I do hereby declare the following to be a full, clear, and exact description of the invention, such as will enable others skilled in the art to which it appertains to make and use the same.

My invention relates to an improvement in scales; and it consists in certain novel features of construction and combinations of parts which will be hereinafter described and pointed out in the claims.

In the accompanying drawings, Figure 1 is a view in front elevation. Fig. 2 is a view in rear elevation, and Fig. 3 is a side elevation.

A represents an upright or support forked at the upper end, as at 1, and having a shaft 2 journaled therein. On this shaft is secured the differential pulley 3, which carries one or more weights suspended therefrom at different points, and on the outer end of the shaft is secured a hand or pointer 5, which indicates on dial 6 the weight of the article being weighed.

A flexible device 7—as, for instance, a cord or cable—is secured at one end to a laterally-projecting arm 8, extending out to one side from the upright or standard, and at its other end to the hub 9 of the pulley, on which it is capable of winding, a groove 10 being provided to receive it. On this cable a pulley-block 12 is strung, the same having a hook 13 to which the article to be weighed is attached.

To counterbalance the weight of the parts and return the hand or pointer 5 to zero, a weight 14 is suspended from the other end of the hub, its cord 15 being adapted to lie in a groove formed in the hub to receive it.

The main portion of the differential pulley 3 takes the place of the ordinary beam of a scale. This pulley begins at nothing at the hub and gradually increases in size in the form of a spiral, so that at one-fourth way around its distance from the central axis will have doubled or more, at one-half way around the distance will have increased in the same ratio, and so on at three-fourths and one round, and still farther around if the graduated pulley is in the form of a screw. A weight 18 is attached to this differential pulley, and the cable 19 which carries the weight enters a groove 20 in the periphery of the pulley, so that when the scales are in their normal position the article to be weighed is placed on hook 13. This causes the differential pulley to turn to the left and cable 19 to wind thereon, the weight being gradually thrown farther and farther away from the axis of the pulley in proportion to the turning of the pulley caused by the increased weight of the article weighed, the hand or pointer 5 indicating on the dial the weight of the article, as is usual.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In scales, the combination with a support, of a differential pulley revolubly supported thereon, a weight, a cable connecting the weight to the pulley, said cable adapted to wind on the periphery of the pulley, a cable connected to the hub of the pulley and to the support, and a pulley-block hung in this cable and to which the article to be weighed is attached, substantially as set forth.

2. In scales, the combination with a revolubly-supported differential pulley, a pair of weights and cables, one cable adapted to wind on the hub of the pulley and the other on its periphery, a cable attached at one end to the hub of the pulley and at its outer end to some rigid support, and a pulley-block hung in this cable to which the article to be weighed is attached, substantially as set forth.

In testimony whereof I have signed this specification in the presence of two subscribing witnesses.

JOHN GADDY DAVIS.

Witnesses:
JAMES S. GRANT,
PATRICK MICHAEL MULHEIM.